May 17, 1932.  C. J. WINKLER  1,859,012
PACKING FOR ROTATING SHAFTS
Filed Jan. 26, 1931
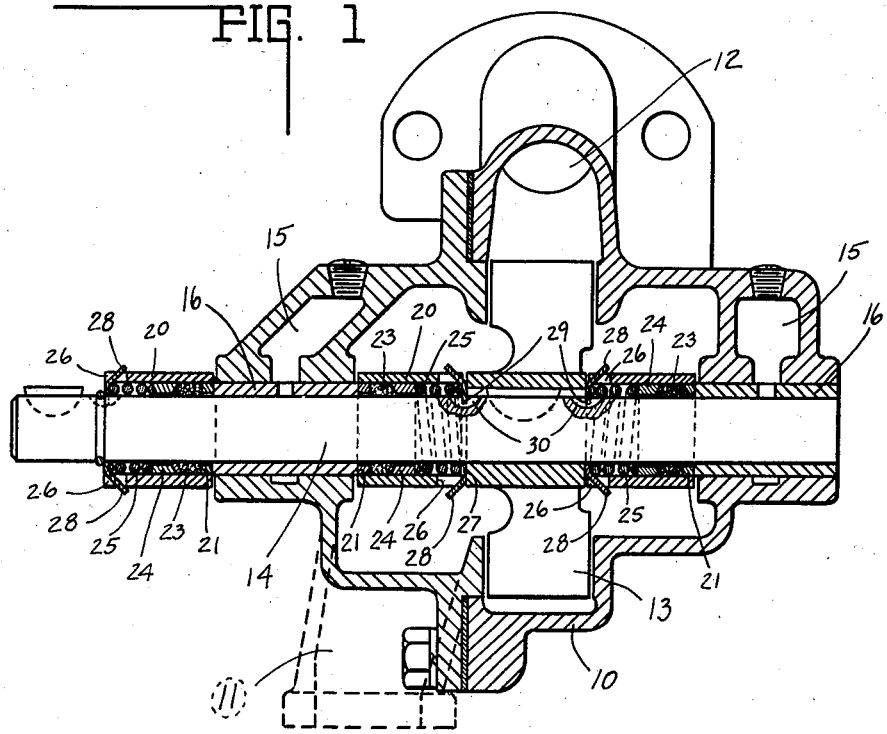
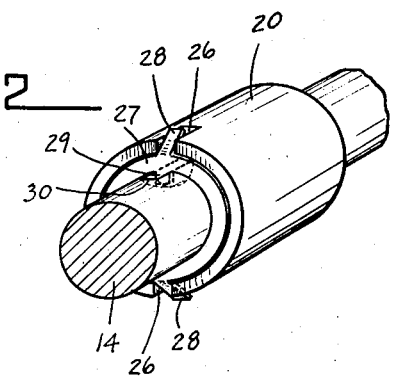
INVENTOR.
CARL J. WINKLER.
BY Lockwood Lockwood
Goldsmith & Salt
ATTORNEYS.

Patented May 17, 1932

1,859,012

UNITED STATES PATENT OFFICE

CARL J. WINKLER, OF INDIANAPOLIS, INDIANA, ASSIGNOR TO SCHWITZER-CUMMINS COMPANY, OF INDIANAPOLIS, INDIANA, A CORPORATION

PACKING FOR ROTATING SHAFTS

Application filed January 26, 1931. Serial No. 511,158.

This invention relates to a packing for a rotating shaft particularly adaptable for use in water pumps, gas compressors and the like.

The principal object of the invention is to provide a packing structure of such a character as to continuously maintain a packing sealed with the shaft, the packing being positively locked for rotation with the shaft whereby a rotating motion thereof relative to the shaft will be avoided, while permitting ready removal of the packing structure for replacement or other purposes.

The particular feature of the invention resides in the provision of a cup-shaped packing sleeve through which the shaft extends provided with an in-turned flange adapted to rotatably bear against a fixed housing or bearing member thereof, providing a compressed packing therein with means contained in the sleeve for maintaining the packing in compressed sealing position about the surface of the shaft and positively locking the sleeve with the packing material therein to the shaft while permitting ready removal thereof.

The full nature of the invention will be understood from the accompanying drawings and the following description and claims.

Fig. 1 is a central vertical section through a pump housing showing a shaft mounted therein with the packing structure illustrated in cross section. Fig. 2 is a perspective view of a section of the shaft showing the packing structure mounted thereon.

In the drawings there is shown a pump housing 10 having an inlet 11 and outlet 12, and enclosing an impeller 13 keyed to the shaft 14. The housing is provided with bearings in which the shaft is rotatably mounted.

For preventing the fluid or the like which passes through the pump housing from escaping into the bearings and prevent the escape of oil contained in the oil reservoirs 15 communicating with the bearings through the bushings 16, there are provided packing structures adjacent the bearings. Similar packing structures may be mounted on the opposite side of said bearings such as that illustrated on the left hand side of the figure for preventing the escape of oil to the exterior portions of the shaft.

The packing structure comprises a sleeve 20 having an inwardly extending bearing ring 21 secured thereto, giving it a cup-shaped form. Said sleeve surrounds the shaft 14 and the bearing ring bears against the end surface of the bushing 16. Within the sleeve 20 there is provided packing material 23 which is pressed against the ring 21 by the packing ring 24. Said packing ring is provided with an inwardly bevelled or undercut end surface so that when forced against the packing 23, it will tend to press it, not only against the ring 21, but inwardly against the surface of the shaft. Also mounted in the sleeve, there is a coil spring 25 bearing against the packing ring 24.

The sleeve 20 is provided with a pair of diametrically opposed and inwardly extending slots 26 formed in the end thereof opposite the flanged end. Adjacent thereto there is provided a locking ring 27 having tongues 28 bent laterally to extend into the slots 26. Said ring bears against the spring 25 on the opposite end from that bearing against the packing ring 24. The locking ring 27 also is provided with inwardly extending tongue 29 formed to extend into a slot 30 provided in the surface of the shaft, whereby said ring will be keyed thereto and rotate therewith.

The locking ring 27 may bear against a fixed member on the shaft such as the impeller 13 or be otherwise locked or secured to the shaft so as to prevent longitudinal movement relative thereto.

From the above, it will be noted that the fixed locking ring 27, through the medium of the spring 25 will force the packing ring 24 against the packing 23 which will be forced thereby against the surface of the shaft for sealing the same against leakage. Said packing will also be forced under the pressure of said ring against the end of the packing sleeve 20 which, in turn, will be forced under spring pressure against the end of the bushing 16. Through the medium of the locking ring 27 the whole bearing structure will rotate with the shaft and with respect to the bushing 16 so that the end surface of the bushing and the bearing ring 21 will have a rotative contact which will dress the surfaces to a perfect sealing fit. In assembling or tearing down the pump structure, the various packing members may be readily slid onto the shaft and in place, or removed therefrom and the ears of the locking ring may be readily bent for purposes of locking with the shaft and bearing sleeve.

As shown and described herein, the flange 21 of the packing sleeve 20 bears directly against the adjacent end of the bushing 16. It is to be understood, however, that the same results are accomplished by the flange of the sleeve 20 bearing directly against the adjacent end surface of the bearing portion of the housing surrounding the bushing 16, and particularly wherein said bushing may be shorter than the bearing portion of the housing. In this respect, the term "bearing" as used herein is inclusive of the bushing 16 and the surrounding or adjacent bearing portion of the housing, it being noted that the bushing does not constitute the bearing but only a part thereof.

The invention claimed is:

1. The combination with a rotatable shaft and a bearing for supporting the same, of a packing structure comprising a cylindrical elongated sleeve having an inwardly extending flange formed on one end thereof adapted to bear against said bearing, packing material positioned in said sleeve and surrounding the shaft adjacent said flanged end, a packing ring slidably mounted in said sleeve and bearing against the packing material, a spring movably mounted in said sleeve and bearing against said packing ring, and means fixedly secured to said shaft and removably interlocked with said sleeve for causing the same to rotate with said shaft and provide a fixed seat for said spring whereby said spring will cause the packing ring to compress the packing material into sealing relation with the shaft and sleeve.

2. The combination with a rotatable shaft and a bearing for supporting the same, of a packing structure comprising a sleeve adapted to bear directly against said bearing, packing material positioned within said sleeve and surrounding the shaft for providing a seal therebetween, and means keyed to said shaft and removably interlocked with said sleeve for causing said sleeve and the packing material contained therein to rotate with said shaft.

3. The combination with a rotatable shaft and a bearing for supporting the same, of a packing structure comprising a sleeve adapted to bear directly against said bearing, packing material positioned within said sleeve and surrounding the shaft for providing a seal therebetween, and a locking ring keyed to said shaft and sleeve for positively rotating said sleeve with the shaft.

4. The combination with a rotatable shaft and a bearing for supporting the same, of a packing structure comprising a sleeve adapted to bear directly against said bearing, said sleeve being provided at its opposite end with a recess formed therein, packing material positioned within said sleeve and surrounding the shaft for providing a seal therebetween, and means extending in said recess for positively locking the sleeve with the shaft.

5. The combination with a rotatable shaft and a bearing for supporting the same, of a packing structure comprising a sleeve adapted to bear directly against said bearing, said sleeve being provided at its opposite end with a recess formed therein, packing material positioned within said sleeve and surrounding the shaft for providing a seal therebetween, and a locking ring keyed to said shaft and provided with an ear formed thereon adapted to extend into the end recess of said sleeve for causing said sleeve to rotate with the shaft.

6. The combination with a rotatable shaft and a bearing for supporting the same, of a packing structure comprising a cylindrical elongated sleeve having an inwardly extending flange formed on one end thereof adapted to bear directly against said bearing, packing material positioned in said sleeve and surrounding the shaft adjacent said flanged end, a packing ring slidably mounted in said sleeve and bearing against the packing material, a spring movably mounted in said sleeve and bearing against said packing ring, and a locking ring surrounding said shaft and keyed thereto, said locking ring being provided with an ear adapted to extend into and interlock with a corresponding recess formed in said sleeve.

7. The combination with a rotatable shaft and a bearing for supporting the same, of a packing structure comprising a cylindrical elongated sleeve having an inwardly extending flange formed on one end thereof adapted to bear directly against said bearing, packing material positioned in said sleeve and surrounding the shaft adjacent said flanged end, a spring movably mounted in said sleeve and bearing against said packing ring, and a locking ring fixedly secured to said shaft and provided with an angularly extending ear adapted to extend into and interlock with a recess formed in said sleeve for rotating said sleeve with the shaft and providing a fixed seat for said spring whereby said spring will cause the packing ring to compress the packing material into sealing relation with the shaft and sleeve.

8. The combination with a rotatable shaft and a bearing for supporting the same, of a packing structure comprising a cylindrical elongated sleeve having an inwardly extending flange formed on one end thereof adapted to bear directly against said bearing, packing material positioned in said sleeve and surrounding the shaft adjacent said flanged end, a packing ring having an inwardly and rearwardly inclined bevelled end surface slidably mounted in said sleeve and bearing against the packing material for forcing it forwardly against said flange and downwardly into sealing relation with said shaft, and a locking ring fixedly secured to said shaft and provided with an angularly extending ear adapted to extend into and interlock with a recess formed in said sleeve for rotating said sleeve with the shaft and providing a fixed seat for said spring whereby said spring will cause the packing ring to compress the packing material into sealing relation with the shaft and sleeve.

In witness whereof, I have hereunto affixed my signature.

CARL J. WINKLER.